United States Patent [19]

Bennett

[11] Patent Number: 5,072,523

[45] Date of Patent: Dec. 17, 1991

[54] ELECTRICAL BOX MOUNTING TOOL

[75] Inventor: M. Dickson Bennett, Wilton, Conn.

[73] Assignee: Dickson Product Development, Inc., Norwalk, Conn.

[21] Appl. No.: 633,322

[22] Filed: Dec. 24, 1990

[51] Int. Cl.⁵ .......................... B25B 11/00; B23Q 3/00
[52] U.S. Cl. .................................. 33/528; 33/DIG. 10; 269/904
[58] Field of Search ................... 248/906; 269/904, 6, 269/50; 33/613, DIG. 10, 528

[56] References Cited

U.S. PATENT DOCUMENTS

| D. 205,722 | 9/1966 | Sunley . |
| D. 230,628 | 3/1974 | Sunley . |
| D. 250,095 | 10/1978 | Douglas et al. . |
| D. 250,255 | 11/1978 | Douglas et al. . |
| D. 259,026 | 4/1981 | Thornton . |
| 2,919,913 | 1/1960 | Phair . |
| 2,956,798 | 10/1960 | Briggs . |
| 2,962,281 | 11/1960 | Hodgson . |
| 2,990,172 | 6/1961 | Gianotta . |
| 3,751,026 | 8/1973 | Stickney ........................ 269/904 X |
| 3,875,669 | 4/1975 | Hull . |
| 3,954,717 | 5/1976 | Tarr . |
| 4,126,941 | 11/1978 | Clarke . |
| 4,181,295 | 1/1980 | Duffy .............................. 269/904 X |
| 4,635,372 | 1/1987 | Tande . |
| 4,750,271 | 6/1988 | Ericksen . |
| 4,850,115 | 7/1989 | Price et al. . |
| 4,888,879 | 12/1989 | Dixon . |
| 4,901,447 | 2/1990 | Gottschalk . |

FOREIGN PATENT DOCUMENTS 2219763  12/1989  United Kingdom .................. 33/562

Primary Examiner—Harry N. Haroian
Attorney, Agent, or Firm—Barry R. Lipsitz

[57] ABSTRACT

A tool is provided for use in mounting electrical boxes to wall studs. An upright member includes a plurality of slots along its length for receiving an electrical box. The slot has a width dimension to hold the box at a predetermined depth for mounting on a stud. The position of the slot along the length of the upright determines the height at which a box will be mounted. Different slots are provided for various box mounting height and depth requirements.

17 Claims, 2 Drawing Sheets

ELECTRICAL BOX MOUNTING TOOL

BACKGROUND OF THE INVENTION

The present invention relates to electrician's tools, and more particularly to a tool for mounting electrical boxes at a proper height and depth.

During the construction of buildings, the basic building framework is first "roughed-in". This includes, in most cases, the erection of wall structures in the form of wood or metal studs attached to floor plates and top plates to form exterior and interior walls. Upon the completion of this stage of construction, electrical outlet boxes and junction boxes are attached to the studs. The electrical wiring for the building can then be put in place with terminations inside the boxes. All of this is completed prior to the enclosure of the wall studs by wallboard or other interior wall surfaces.

During rough construction, the location of electrical boxes for outlets and wall switches must be determined vertically from the floor. The boxes must also be mounted to extend outwardly from the front surface of the studs a predetermined amount established by the thickness of the finished wall materials to be placed over the studs. To accomplish this, the electrician must measure both the vertical height and depth of each box to be mounted. This relatively time consuming task reduces the electrician's efficiency. In addition, variations can occur due to measurement errors, which may result in some boxes being mounted noticeably too high or too low. Errors in depth measurements can cause gaps between the switch plate or outlet plate and the wall in the finished project, or can make it difficult to mount the wall plates if the box does not project fully into the wallboard or other finish material.

In the past, a variety of different devices have been proposed for assisting in the mounting of electrical boxes on studs of a building under construction. Most of the prior art structures use complicated mechanisms to hold the box and/or provide for adjustability. U.S. Pat. No. 4,750,271 to Ericksen provides a spring loaded clamp member for holding a box while it is being nailed to a stud. The clamp member is mounted to a pipe for adjustable vertical positioning.

U.S Pat. No. 2,990,172 to Gianotta provides an adjustable upright with a box support containing spring clips. U.S. Pat. No. 4,126,941 to Clarke provides a template for positioning electrical outlet and switch boxes. There is no means provided to hold the box while it is being mounted.

U.S. Pat. Nos. 2,919,913 to Phair; 2,962,281 to Hodgson; 2,956,798 to Briggs; 3,875,669 to Hull; 3,954,717 to Tarr; 4,635,372 to Tande; 4,850,115 to Price, et al.; 4,888,879 to Dixon; and 4,901,447 to Gottschalk all disclose electrical box mounting tools that are quite complex and include a large number of parts. U.S. Design Pat. No. 205,722; 230,628; 250,095; 250,255; and 259,026 disclose somewhat simpler devices for locating junction boxes.

It would be advantageous to provide an easy to use, low cost one-piece tool that both positions a box and holds the box during installation. Proper height and depth of the box should be provided. The present invention provides such a tool.

SUMMARY OF THE INVENTION

In accordance with the present invention, an electrical box mounting tool is provided comprising a channel member with a longitudinal slot provided at a measured distance along the length thereof for receiving an electrical box. The channel member comprises a back wall and a sidewall, connected at a corner, with the slot provided at the corner. In a preferred embodiment, the channel member comprises first and second sidewalls connected to the back wall at respective corners, with at least one slot provided at each corner.

In order to provide box mountings at different heights and depths, a plurality of longitudinal slots can be provided along the length of the channel member. By locating the slots asymmetrically along the length of the channel member, mounting at different vertical heights can be provided. By providing slots that extend into the channel sidewall(s) to a different depth, different box mounting depths can be accommodated. Identical sets of slots can be provided on each of the first and second channel sidewalls to enable the mounting of boxes to either side of a vertical stud.

DETAILED DESCRIPTION OF THE INVENTION

Figure 1:
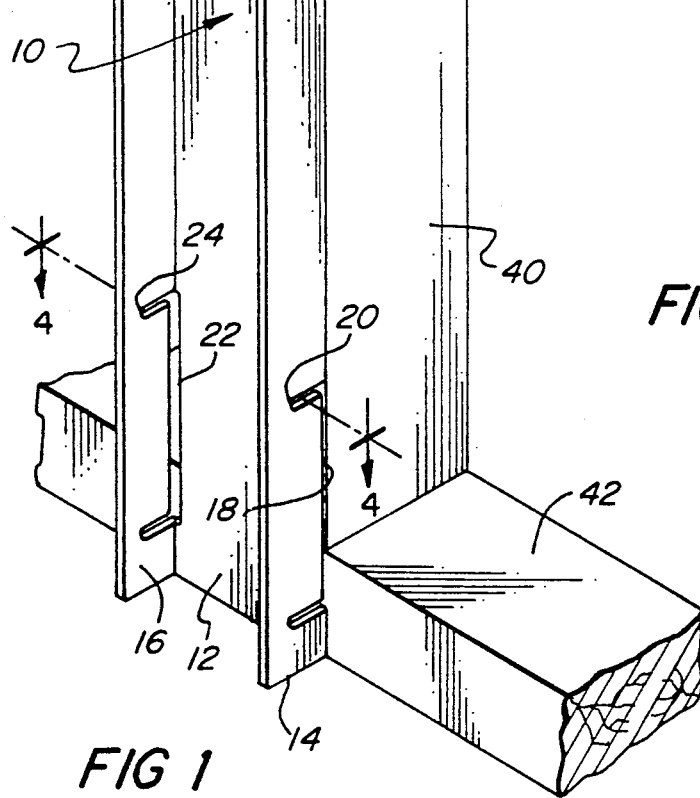
FIG. 1 is a perspective view of a tool in accordance with the present invention being used to mount an electrical box on a stud.
Figure 2:
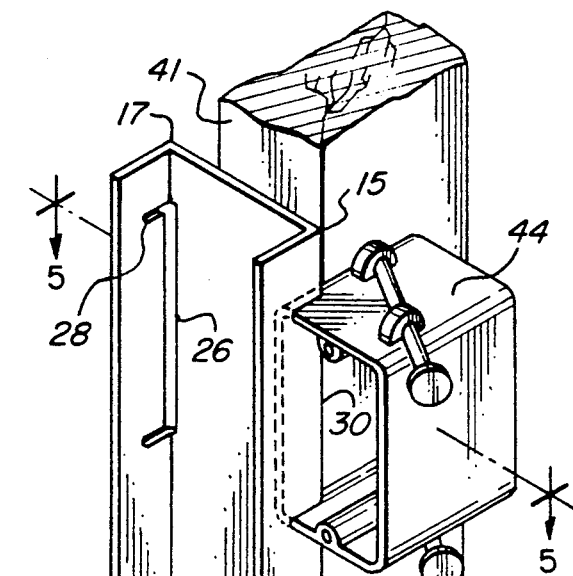
FIG. 2 is a partial side elevation of the tool illustrated in FIG. 1.

An electrical box mounting tool 10 in accordance with the present invention is illustrated in FIG. 1. The tool comprises an upright member, illustrated as a channel member having a back wall 12, first sidewall 14, and second sidewall 16. First sidewall 14 forms a corner 15 where it joins with back wall 12. Similarly, second sidewall 16 forms a corner 17 at its junction with back wall 12.

Figure 3:
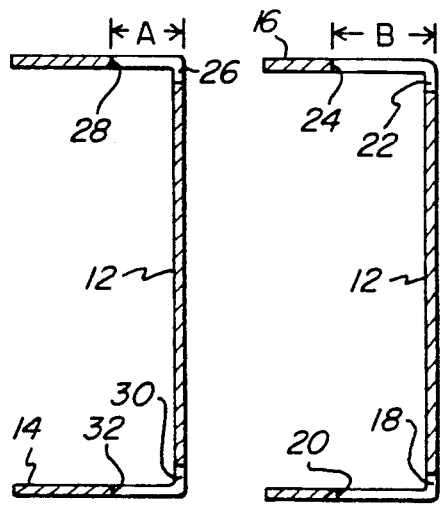
FIG. 3 is a cross-sectional view taken along the line 3—3 of FIG. 2.
Figure 4:
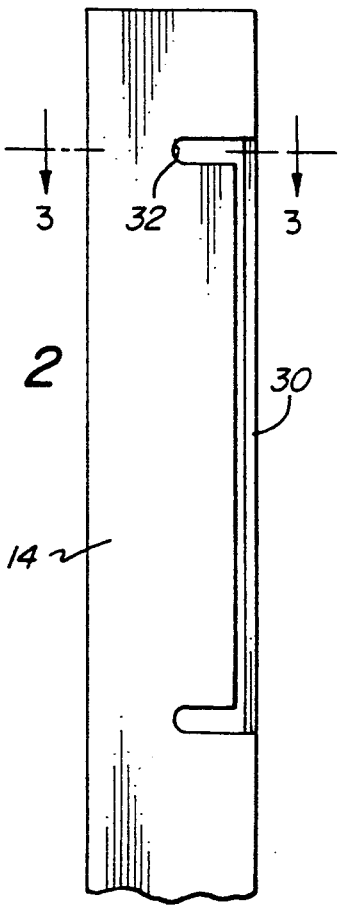
FIG. 4 is a cross-sectional view taken along the line 4—4 of FIG. 1.

A pair of slots 18, 30 is provided in corner 15. A corresponding pair of slots 22, 26 is provided in corner 17. Slots 26 and 30 have equal depths 28, 32 designated by dimension A in FIG. 3. The depth 20 of slot 18 and depth 24 of slot 22 are greater than those of slots 26, 30, as indicated by dimension B in FIG. 4. As explained below, the provision of different depth slots enables a box 44 to be mounted to a stud 40 at different depths corresponding to the thickness of different wallboard materials. For example, slots 18 and 22 can be dimensioned to provide for the mounting of electrical boxes where wallboard of a first thickness (e.g., ⅝") is to be used, and slots 26, 30 dimensioned to accommodate another thickness wallboard (e.g., ¼").

Figure 5:
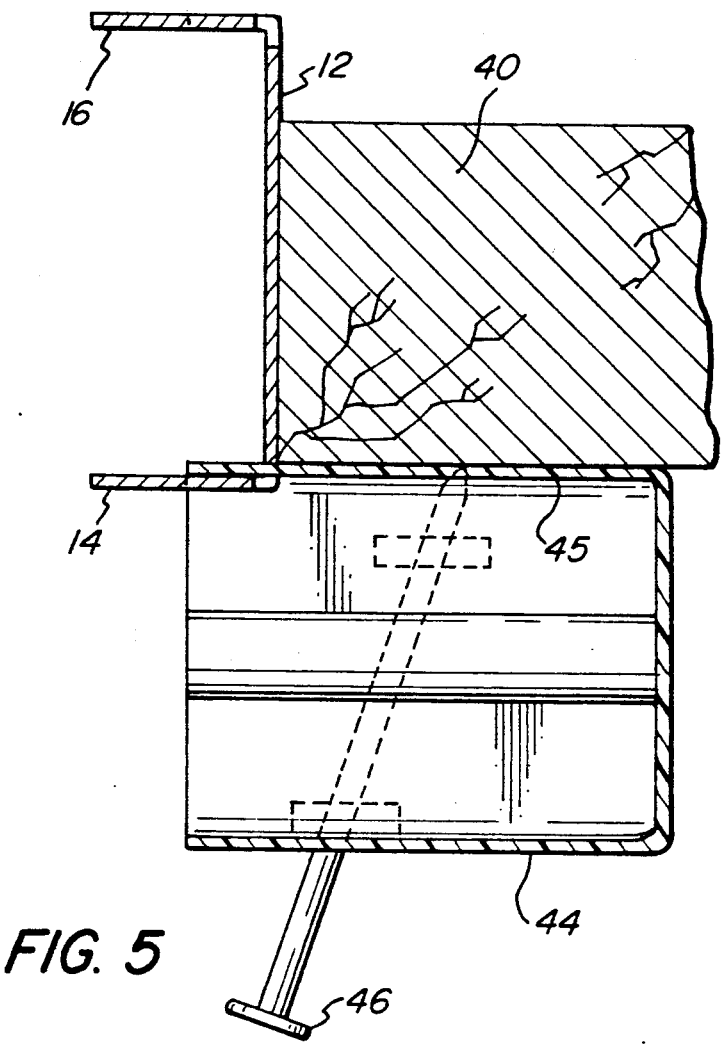
FIG. 5 is a cross-sectional view taken along the line 5—5 of FIG. 1.

In order to use the tool of the present invention, a box 44 is inserted into an appropriate slot (depending on the thickness of wallboard to be used) with the box sidewall 45 adjoining the inside of the respective tool sidewall, such as sidewall 14 as illustrated in FIG. 5. The box and tool are then positioned in front of a stud 40 to which the box is to be mounted, with an end of the tool resting on the floor against plate 42. As illustrated in FIG. 1, the position of slot 30 along the length of corner 15 determines how high box 44 will be mounted off the floor. The depth 32 of slot 40 determines how far the box will extend from the front surface 41 of stud 40. After being placed in position, box 44 is mounted by driving nail 46 into stud 40 in a conventional manner.

The provision of slots 26 and 30 enable box 44 to be mounted at depth A on either side of stud 40. Similarly, the provision of slots 18 and 22 enable the box to be mounted on either side of stud 40 at depth B. In order to use slots 18, 22, tool 10 is rotated 180° from the position shown in FIG. 1 so that slots 18, 22 are at the proper box mounting height.

Figure 6:
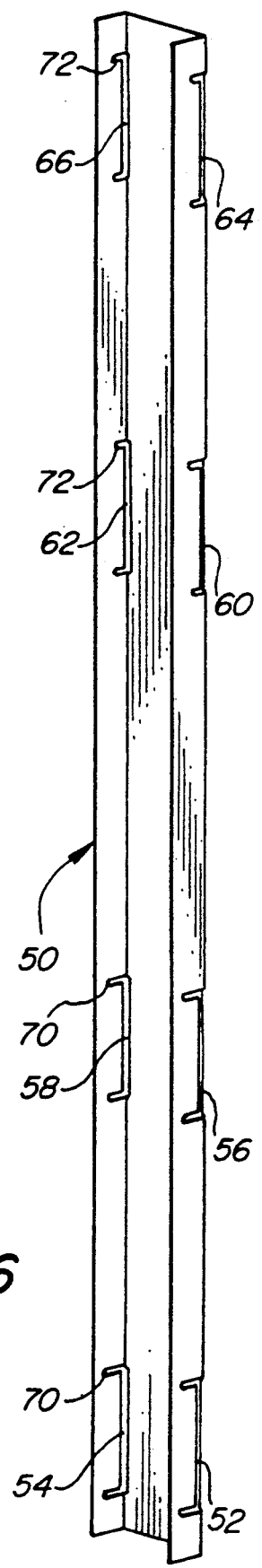
FIG. 6 is a perspective view of an alternate embodiment of a tool in accordance with the present invention.

FIG. 6 illustrates an alternate embodiment of the invention, in which tool 50 enables the mounting of boxes at the proper heights for electrical outlets and switches. Slots 52, 54 and 64, 66 are provided for mounting boxes that will ultimately house electrical switches. Slots 52, 54 provide for switch box mounting at a first depth 70. Slots 64, 66 provide for switch box mounting at a second depth 72.

Tool 50 also provides slots 56, 58 and 60, 62 for mounting electrical outlet boxes at a proper height. Slots 56 and 58 are used to mount the electrical outlet boxes at first depth 70. Slots 60, 62 are provided to mount electrical outlet boxes at second depth 72. In the orientation shown in FIG. 6, slots 56 and 58 are at the proper height for electrical outlet box mounting and slots 64, 66 are at the proper height for switch box mounting. By turning tool 50 from top to bottom 180°, slots 52, 54 will be at the proper height for switch box mounting, and slots 60, 62 will be at the proper height for outlet box mounting.

It should now be appreciated that the present invention provides a simple, one-piece tool for mounting electrical boxes. A box to be mounted is inserted into an appropriate slot, depending on the desired mounting height, depth, and side of the stud to which the box is to be mounted. Several slots are provided in the tool to accommodate different dimensions. Additional slots can be provided for mounting boxes at desired heights and-/or depths.

Although the embodiment has been described in connection with several illustrated embodiments, those skilled in the art will appreciate that various modifications and adaptations may be made thereto without departing from the spirit and scope of the invention, as set forth in the following claims.

What is claimed is:

1. An electrical box mounting tool comprising:
a channel member having a back wall and a sidewall connected at a corner; and
a longitudinal slot provided at said corner at a measured distance along the length of said channel member for receiving an electrical box.

2. A tool in accordance with claim 1 wherein:
said channel member comprises first and second sidewalls connected to said back wall at respective corners; and
at least one slot is provided at each corner.

3. A tool in accordance with claim 1 further comprising:
an additional longitudinal slot at said corner for receiving an electrical box;
wherein said slots are located asymmetrically along the length of said channel member.

4. A tool in accordance with claim 1 further comprising:
an additional longitudinal slot at said corner for receiving an electrical box;
wherein each of said slots extends into said sidewall to a different depth.

5. A tool in accordance with claim 1 wherein:
said channel member comprises, a first sidewall connected to said back wall at a first corner, and a second sidewall connected to said back wall at a second corner; and
a plurality of longitudinal slots are provided along the length of at least said first corner.

6. A tool in accordance with claim 5 wherein said slots are located asymmetrically along the length of said channel member.

7. A tool in accordance with claim 5 wherein each of said slots extends into said first sidewall to a different depth.

8. A tool for use in mounting an electrical box on a stud comprising:
an upright member having a back wall and a sidewall connected to said back wall forming a corner; and
a slot provided at said corner along the length of said upright for receiving an electrical box, said slot having a width dimensioned to hold said box at a predetermined depth for mounting on a stud.

9. A tool in accordance with claim 8 comprising a plurality of said slots.

10. A tool in accordance with claim 9 wherein said slots are arranged at different points along the length of said upright to provide for the mounting of electrical boxes at different heights.

11. A tool in accordance with claim 10 wherein said slots have different widths for mounting electrical boxes at different depths.

12. A tool in accordance with claim 9 wherein said slots have different widths for mounting electrical boxes at different depths.

13. A tool in accordance with claim 8 wherein:
said upright member comprises a channel having a back wall and a pair of corners formed by sidewalls attached thereto at opposite ends of said back wall along the length thereof; and
said slot resides in one of said corners.

14. A tool in accordance with claim 13 further comprising:
a pair of slots in said one corner, each slot having a different width.

15. A tool in accordance with claim 14 further comprising:
a second pair of slots in the other corner, each having a different width.

16. A tool in accordance with claim 15 wherein the two pairs of slots are identical.

17. A tool in accordance with claim 16 wherein the slots are symmetrically arranged along the length of said upright member.

* * * * *